(12) United States Patent
Jing et al.

(10) Patent No.: US 8,547,482 B2
(45) Date of Patent: Oct. 1, 2013

(54) DISPLAY SYSTEM AND METHOD FOR A FREEZE FRAME FEATURE FOR STREAMING VIDEO

(75) Inventors: Xiangpeng Jing, San Diego, CA (US); Seungwook Hong, San Diego, CA (US); Aixin Liu, San Diego, CA (US); Djung Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1075 days.

(21) Appl. No.: 12/320,402

(22) Filed: Jan. 26, 2009

(65) Prior Publication Data

US 2010/0188577 A1 Jul. 29, 2010

(51) Int. Cl.
*H04N 5/225* (2006.01)
*H04N 5/44* (2011.01)
*H04N 5/445* (2011.01)
*H04N 5/45* (2011.01)

(52) U.S. Cl.
USPC .......................................................... 348/565

(58) Field of Classification Search
USPC .......................................................... 348/559
See application file for complete search history.

(56) References Cited

U.S. PATENT DOCUMENTS

| | | | |
|---|---|---|---|
| 2005/0030427 A1* | 2/2005 | Yamada | 348/559 |
| 2005/0111549 A1* | 5/2005 | Kim et al. | 375/240.12 |

* cited by examiner

*Primary Examiner* — Jefferey Harold
*Assistant Examiner* — Michael Teitelbaum
(74) *Attorney, Agent, or Firm* — Haverstock & Owens LLP (57) ABSTRACT

An embodiment may include a method or system for capturing still images from a video stream. The embodiment may operate in a playback mode and a capture mode. Operating in playback mode may include decoding and playing the input video stream at a first resolution. Operating in capture mode may include showing a still video frame from the input video stream while decoding and playing the input video stream at a second resolution. The embodiment may include a display, a control device, a video decoder, and a signal receiver. The embodiment may also include a buffer for storing decoded images for capture and display during video playback.

12 Claims, 7 Drawing Sheets

DISPLAY SYSTEM AND METHOD FOR A FREEZE FRAME FEATURE FOR STREAMING VIDEO

BACKGROUND OF THE INVENTION

1. Field of the Invention

This invention relates generally to streaming video and, more particularly, to capturing still images from a streaming video and transferring the still image to storage.

2. Description of the Related Art

Video broadcast content is a ubiquitous part of modern life. Video broadcast content is generally accessible via radio transmission or wired connections which provide a video stream to a display device, such as televisions, computers, or handheld devices.

These video streams often provide unexpected and unique images which users often want to capture and retain for later use. When viewers of video content notice an interesting image in a video frame that they may desire to capture and retain, they are currently forced to go to extensive effort to obtain or capture the video frame. These efforts go beyond what the general viewer is willing to perform. For example, to capture an image a viewer may need to be actively recording the video content onto a storage media, so as to be able to parse the content at a later time and extract the desired video frame. Alternatively, a user may need to obtain and search recorded copies of the video content, which may not be easily accessible.

Furthermore, even if a user is equipped to record the video stream, there is a second problem regarding the response time between when a user identifies a desired frame and when the device halts the video stream. This is because of the lag time between when the user recognizes a desired frame in the video, when the user successfully presses the pause button, and when the video stream halts.

SUMMARY OF THE INVENTION

The present invention provides a freeze frame feature for capturing video content from a video stream, without halting the playback of the input video stream and while allowing a viewer to, simultaneously, capture and view still image content from the video stream. The freeze frame device maintains a component that continuously buffers a predetermined number of frames from the video stream, during playback, thereby anticipating the lag time between user action and the playback of the desired frame.

An embodiment of the present invention may include a system for capturing still images from a video stream capable of operating in a playback mode and a capture mode. The system may include a display, a control device, a video decoder, and a signal receiver. The control device may provide command signals to the signal receiver. The decoder may decode the video stream at a first resolution. The signal receiver may instruct the system to switch from operating in the playback mode to operating in the capture mode in response to a first signal, and from operating in the capture mode to operating in the playback mode in response to a second signal.

The embodiment may also include a buffer coupled to the video decoder, that stores a preset number of consecutive video frames, and a video processor for combining video frames from the video decoder and buffer. The decoder may also decode the input video stream at a second resolution.

Furthermore or alternatively, the embodiment may include a second video decoder, that decodes the video stream at a second resolution, and a video processor for combining video frames from the first and second video decoders based on whether the system is operating in playback mode or capture mode.

Another embodiment may include a method for capturing a still image from an input video stream including receiving the input video stream, operating in a playback mode, receiving commands from a control device, switching from operating in the playback mode to a capture mode in response to the received commands, and operating in capture mode.

The method may also include receiving a second command from the control device and switching from operating in the capture mode to operating in the playback mode in response to another command from the control device.

Operating in playback mode may include decoding and playing the input video stream at a first resolution. Operating in capture mode may include showing a still video frame from the input video stream while decoding and playing the input video stream at a second resolution. The decoding of the input video may be performed by a first decoder, while decoding the input video stream at a second resolution by a second decoder.

Furthermore or alternatively, the method may also include buffering a preset number of consecutive video frames from the video stream preceding a current video frame at the first resolution. The method may also include responding to a next image command, by identifying and displaying the next image in the buffer, or previous image command, by identifying and displaying the previous image in the buffer if one exists. Furthermore, the method may include saving a still image to a persistent memory device.

The present invention can be embodied in various forms, including televisions and monitor devices, set-top boxes, computer systems and networks, business processes, computer implemented methods, computer program products, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
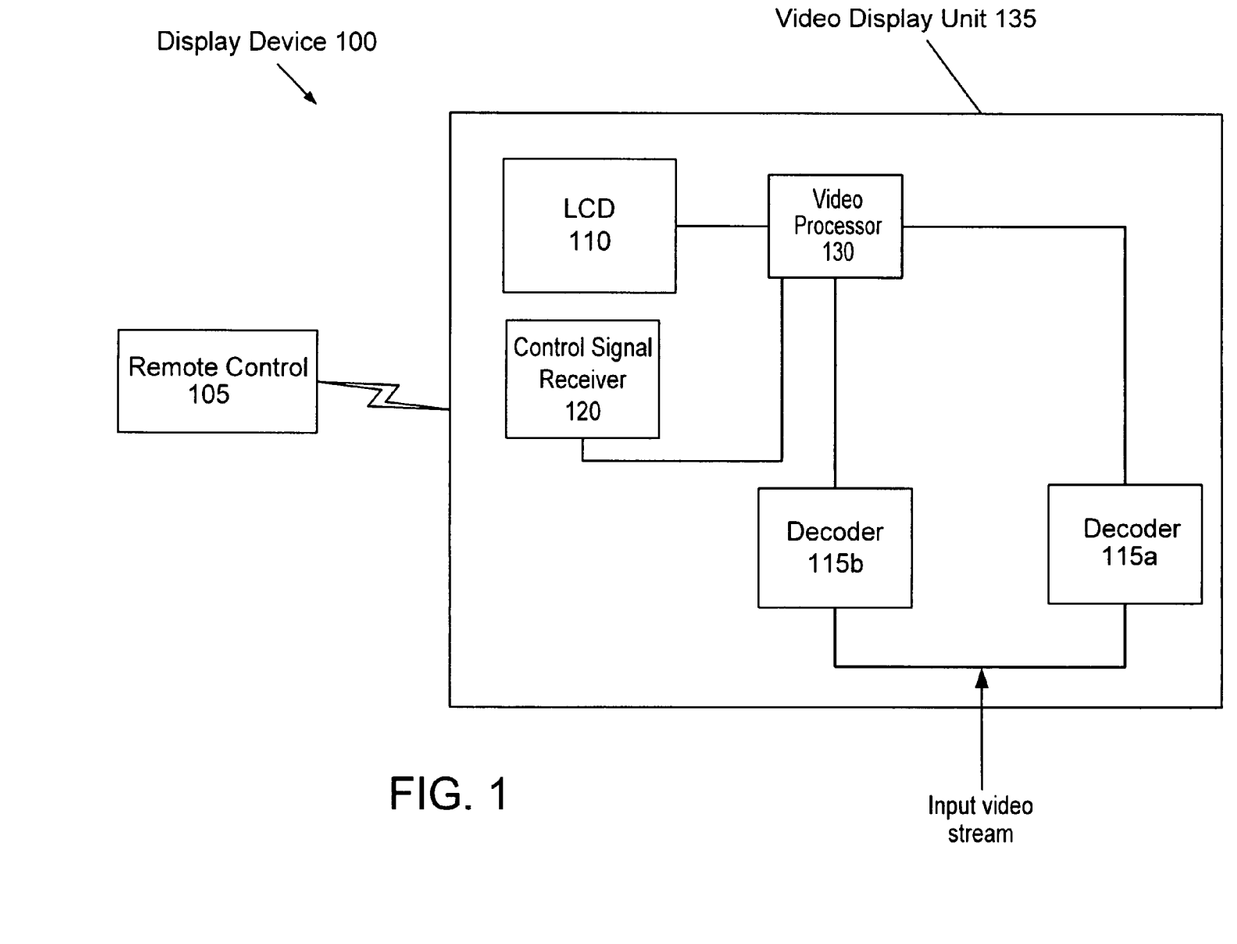
FIG. 1 is a block diagram illustrating the components of an example embodiment of the present invention.

FIG. 1 illustrates an example embodiment of the components of display device 100. Display device 100 includes a remote control 105 for controlling video display unit 135.

Video display unit 135 includes a control signal receiver 120 which provides control signals to video processor 130. Decoder 115a produces a video frame signal having a first resolution in response to an input video stream, and decoder 115b provide a video frame signal at a second resolution in response to the input video stream. Video processor 130 integrates the video frame signals from decoder 115a and decoder 115b based on the signals received from control signal receiver 120. The resulting combined video signal is provided to LCD 110.

The video display unit 135 may operate in either a playback mode or a capture mode. The signals received from remote control 105 by control signal receiver 120 may include a pause signal to switch from playback mode to capture mode, a next or previous signal to advance or regress by a single frame, or a return signal to switch from capture mode to playback mode.

When operating in playback mode, video processor 130 only displays the video frames decoded by decoder 115a. In this mode, the input video stream entering video display unit 135 is decoded by decoder 115a at the first resolution. The first resolution is generally the full resolution of the display device or the display resolution commonly used for watching an input video stream. The decoded video signal from decoder 115a passes to video processor 130 and then displayed by LCD 110.

When operating in capture mode, the video processor 135 displays a still video frame decoded by decoder 115a, and a playback of the input video stream decoded by decoder 115b using a PiP or PaP display. In this mode, the input video stream entering video display unit 135 is decoded by decoder 115a at the first resolution and by decoder 115a at the second resolution. The second resolution may generally be a lower resolution than the first resolution, for example the second resolution may be the resolution for a picture in picture display (PiP) or a picture and picture display (PaP). These lower resolution video frames are provided to video processor 130. Video processor 130 then combines a still video frame from decoder 115a, while playing video from decoder 115b.

Video display unit 135 may be any display device such as a monitor, television or any other display device that may be modified in accordance with the present invention. Furthermore, while video display unit 135 is illustrated as a single device, video display unit 135 may be a video signal processing device that is mounted or attached to a display device, such as a monitor or television.

Remote control 105 may also be a wired or wireless control device such as a handheld control, keyboard, mouse, or any other device capable of providing the necessary control mechanisms for issuing control signals and manipulating the displayed video signal.

The input video stream may be transmitted to display device 100 via either computer-readable media or transmission media. Transmission media may include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. This includes broadcast signals from over-the-air, satellite, or cable transmissions. Common forms of computer-readable media include, for example, a floppy disk, a flexible disk, hard disk, magnetic tape, any other magnetic medium, a CD-ROM, DVD, any other optical medium, a RAM, a PROM, an EPROM, a FLASH-EEPROM, any other memory chip or cartridge, a carrier wave as described hereinafter, or any other medium from which a computer can read.

Video processor 130 may employ instructions executable by one or more processors. Computer-executable instructions may be compiled or interpreted from computer programs created using a variety of programming languages and/or technologies known to those skilled in the art, including, without limitation, and either alone or in combination, Java™, C, C++, Assembly, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Figure 2:
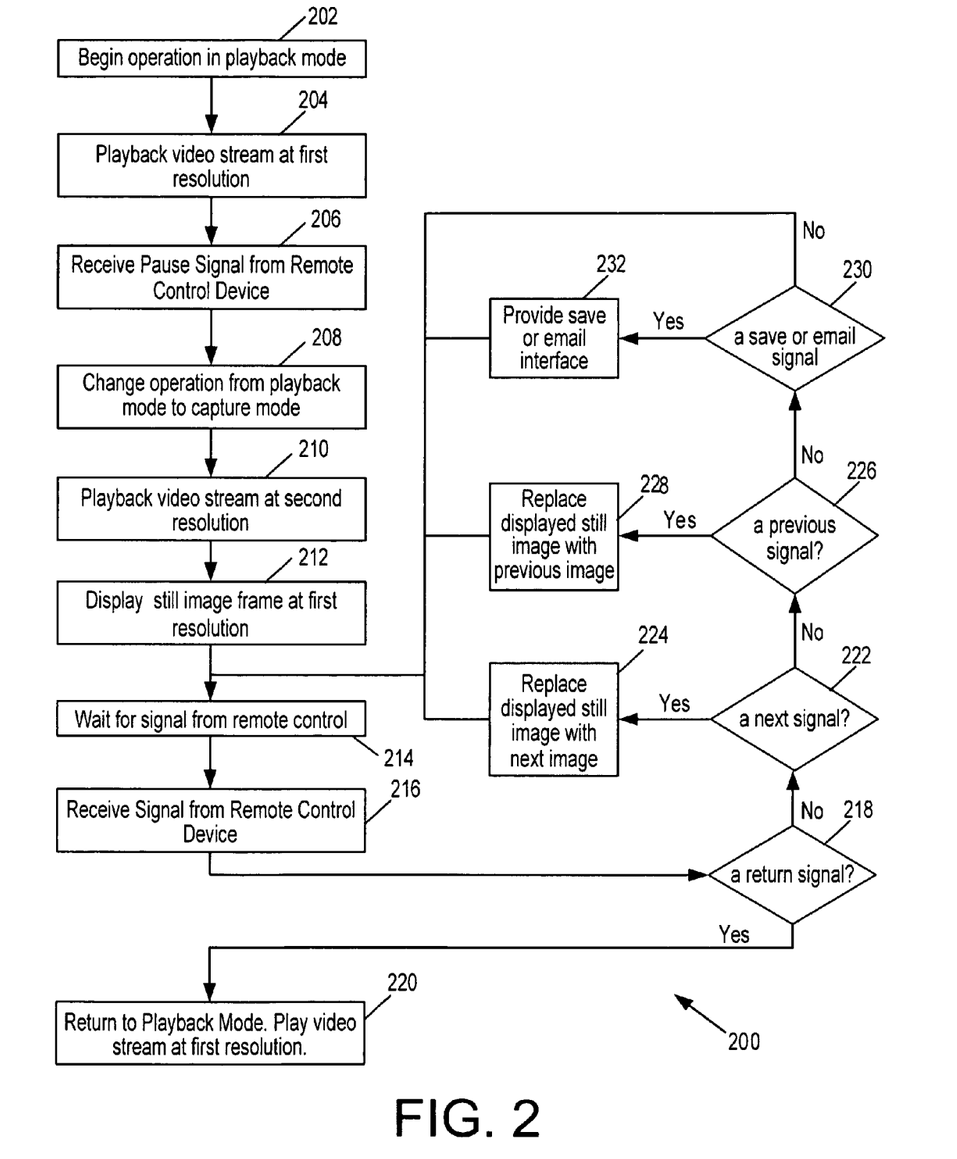
FIG. 2 is a flow diagram illustrating the logical steps performed by the example embodiment of the present invention.

FIG. 2 is a flow diagram illustrating the steps performed by an example embodiment of the image capture process 200 performed by display device 100, in accordance with the present invention.

Video display unit 135 initially begins to operate in playback mode, in step 202.

During playback mode, in step 204, video display unit 135 plays the input video stream at the first resolution. The first resolution is generally the full or maximum resolution of the display device based on LCD 110. In step 206, the user presses the pause button on remote control device 105, causing the video display unit 135 to change its operating mode from playback mode to capture mode 208. Alternatively, the user may initiate capture mode using a button or mechanism.

During capture mode, in step 210, video display unit 135 continues to play the input video stream at the second resolution, while at the same time, in step 212, providing a still video frame, at the first resolution, of a video frame corresponding to the video frame on the LCD 110 immediately prior to when the pause signal was received, at step 206.

At step 214, video display unit 135 waits for another command signal from remote control device 105.

At step 216, video display unit 135 receives another command signal from the remote control device 105. Video display unit 135 then determines whether the signal is a return signal (step 218), a next signal (step 222), a previous signal (step 226), or a save signal (step 232).

If the signal is a return signal, step 218, video display unit 135 returns to playback mode 220 and continues to play the input video stream at the first resolution.

If the signal is a next signal, step 222, video display unit 135 proceeds to step 224. At step 224, the displayed still video frame is replaced with the next corresponding video frame, which is decoded by decoder 115a and provided to video processor 130.

If the signal is a previous signal, step 226, video display unit 135 proceeds to step 228. At step 228, video processor 130 retrieves a previous video frame from decoder 115a, and replaces the current still video frame displayed at the first resolution with a previous image from decoder 115a.

If the signal is a save signal, step 230, video display unit 135 proceeds to step 232. At step 232, the system provides an interface by which the user can save the image to a local hard drive, e-mail the image to a remote location for later use, or archive the image in any other known way.

Figure 3:
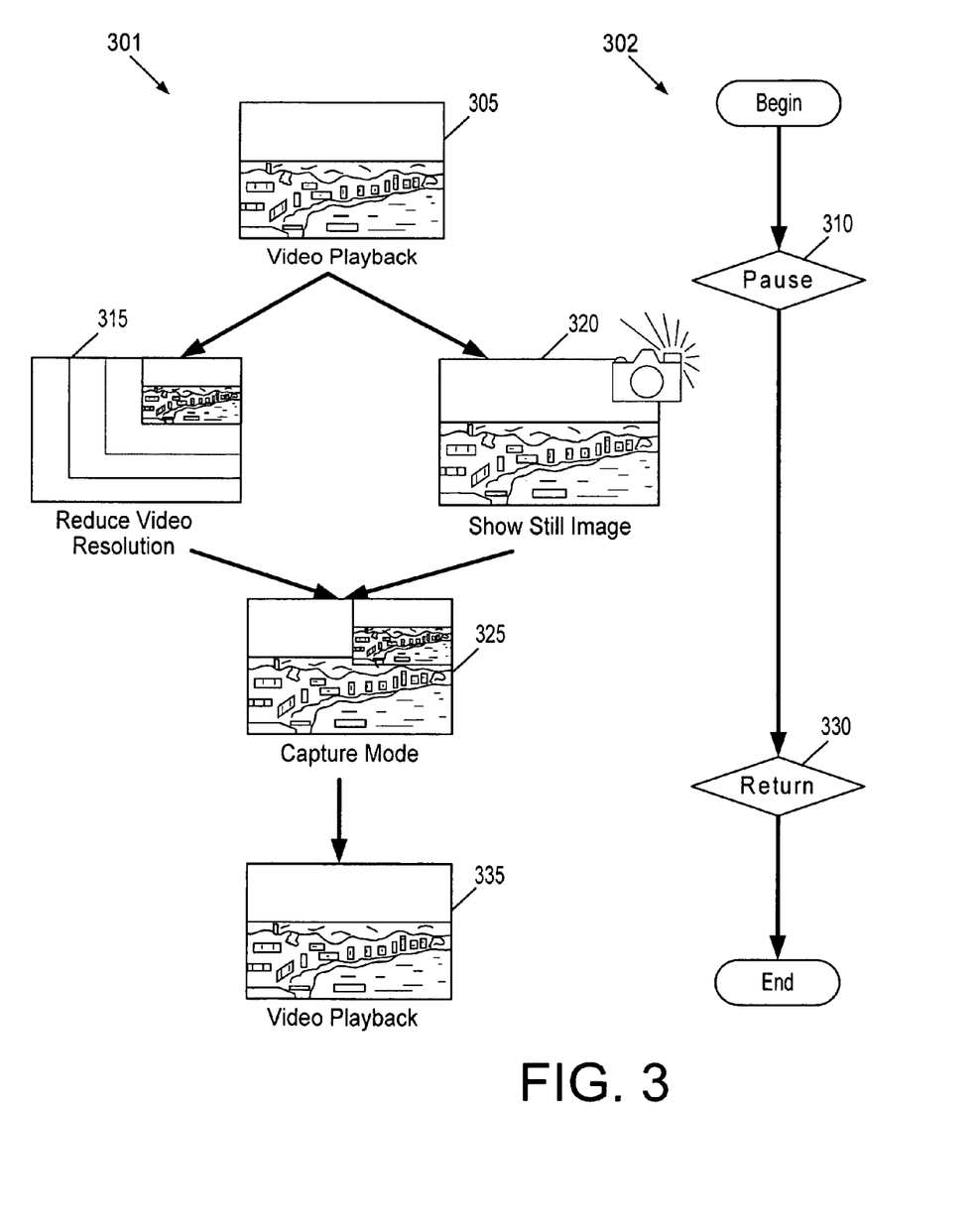
FIG. 3 is a flow diagram illustrating the resulting display in response to the logical steps performed by an example embodiment of the present invention.

FIG. 3 illustrates an example of the visual on-screen results 301 on the LCD 110 that may result in response to command signals from remote control device 105, relative to timeline 302.

Initially, the system begins operating in video playback mode 305.

At point 310 in the timeline, in response to a pause signal from a control device 105, video display unit 135 switches to capture mode. This includes continuing video playback at reduced resolution 315 using decoder 115*a* and providing a still video frame 320 of the frame played when the pause command was received. Still video frame 320 is obtained from decoder 115*a*. The reduced video resolution playback and the still video frame are shown simultaneously during capture mode 325 using a Pip or PaP display mechanism. In the example embodiment. The still video frame is shown in the full resolution, while reduced video playback continues in the small resolution box in the top right using PiP.

When a return command 330 is received from the remote control device 105, the system returns to video playback mode 335, removing PiP or PaP and continuing playback of the input video stream at the first resolution using decoder 115*a*.

Figure 4:
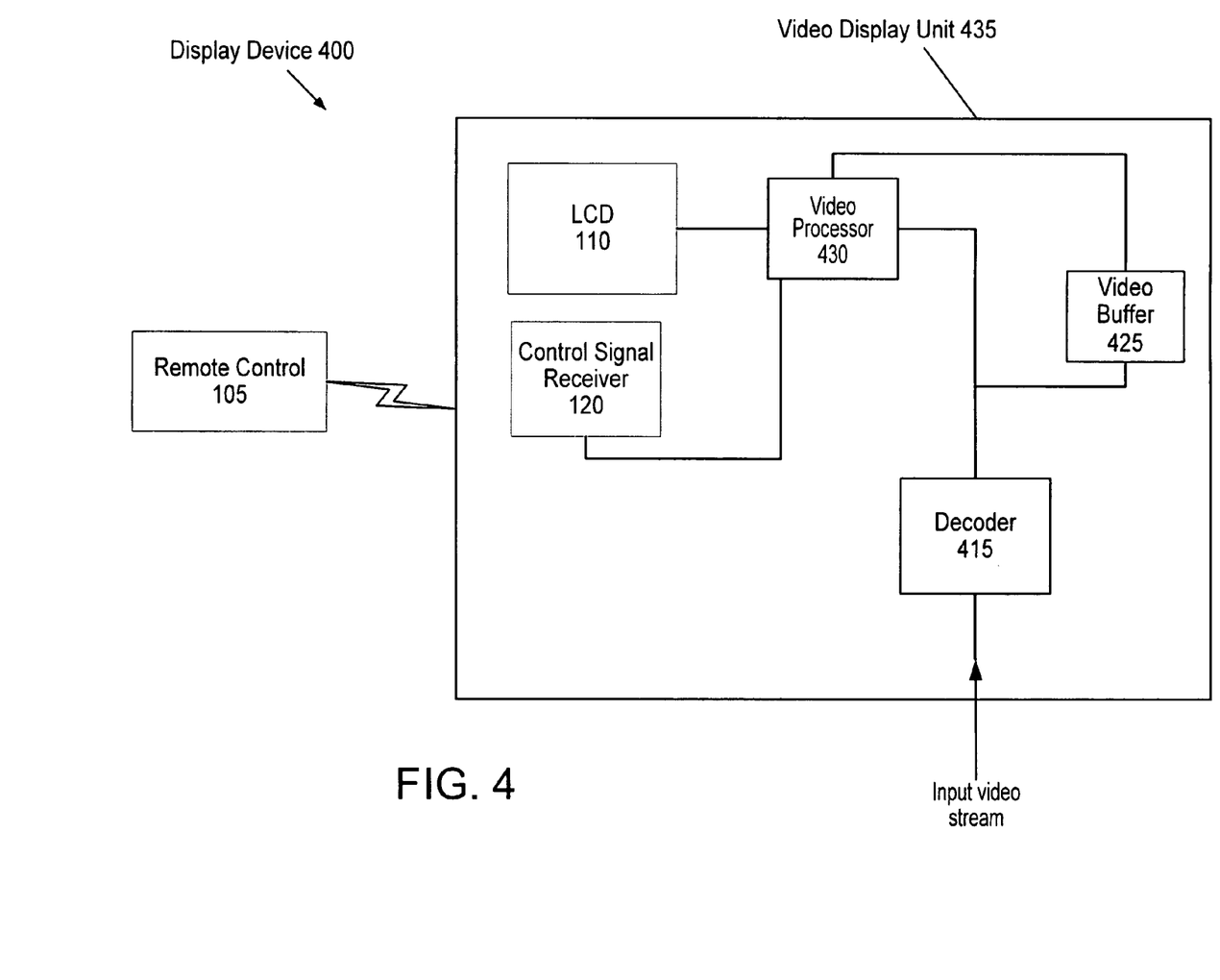
FIG. 4 is a block diagram illustrating the components of a second example embodiment of the present invention.

FIG. 4 illustrates a second example embodiment a display device 400. Display device 400 includes a remote control 105 for controlling video display unit 435.

Video display unit 435 includes control signal receiver 120 which provides control signals to video processor 430. Decoder 415 may produce video signals having a first resolution and a second resolution in response to the input video stream. Buffer 425 buffers images from decoder 415 at the first resolution and provides the buffered images to video processor 430. Video processor 430 integrates the video signals from decoder 415 and buffer 425 based on the signals received from control signal receiver 120. The resulting video signal is provided to LCD 110.

Similarly to video display unit 135, video display unit 435 may operate in either a playback mode or a capture mode. The signals received from remote control 105 by control signal receiver 120 may include a signal to switch from playback mode to capture mode, a next or previous signal to advance or regress by a single frame, or a return signal to switch from capture mode to playback mode.

When operating in playback mode, video processor 130 only displays the video frames decoded by decoder 415 in the first resolution. During this time, buffer 425 stores a predetermined number of frames preceding the current playback frame at the first resolution.

When operating in capture mode, the input video stream entering video display unit 435 is decoded by decoder 415 at the first resolution. Video processor 430 continues playback using the second resolution video using a PiP or PaP display, while the first resolution video output of decoder 415 is stored in buffer 425. Video processor 430 combines the still video frames from video buffer 125 with the second resolution video from decoder 415.

Video buffer 425 may take many forms, including, but not limited to, non-volatile media, volatile media, and transmission media. Non-volatile media include, for example, optical or magnetic disks and other persistent memory.

Figure 5:
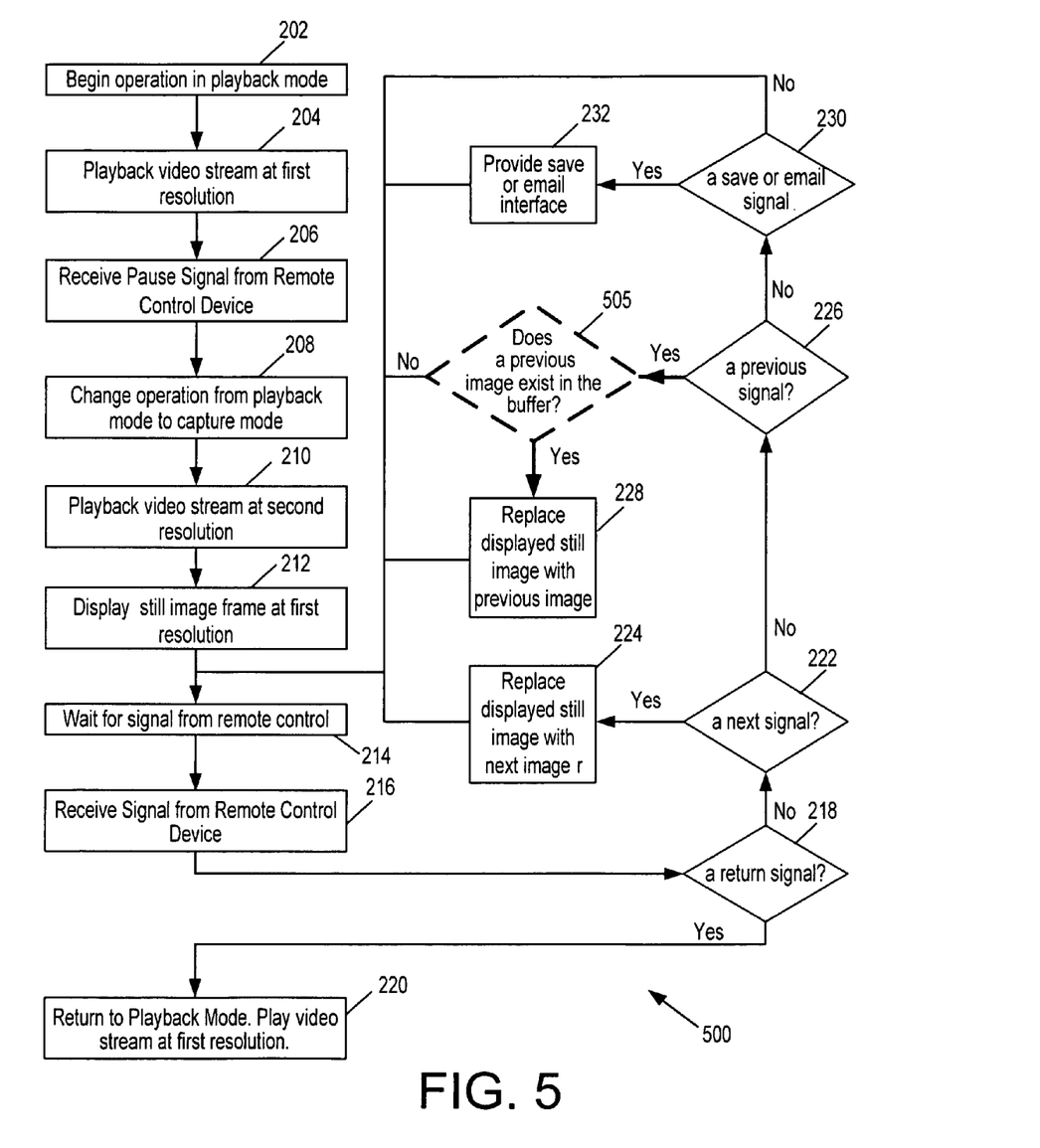
FIG. 5 is a flow diagram illustrating the logical steps performed by the second example embodiment of the present invention.

FIG. 5 is a flow diagram illustrating the logical steps performed by an example embodiment of the image capture process 500 performed by display device 400, in accordance with the present invention. The flow diagram of FIG. 5 is similar to FIG. 2, but incorporates new decision step 505, which recognizes that as images cycle through the buffer 425, previous images may no longer be available. To address this situation, the process verifies if a previous image is in the buffer, before attempting to show the previous image.

Figure 6:
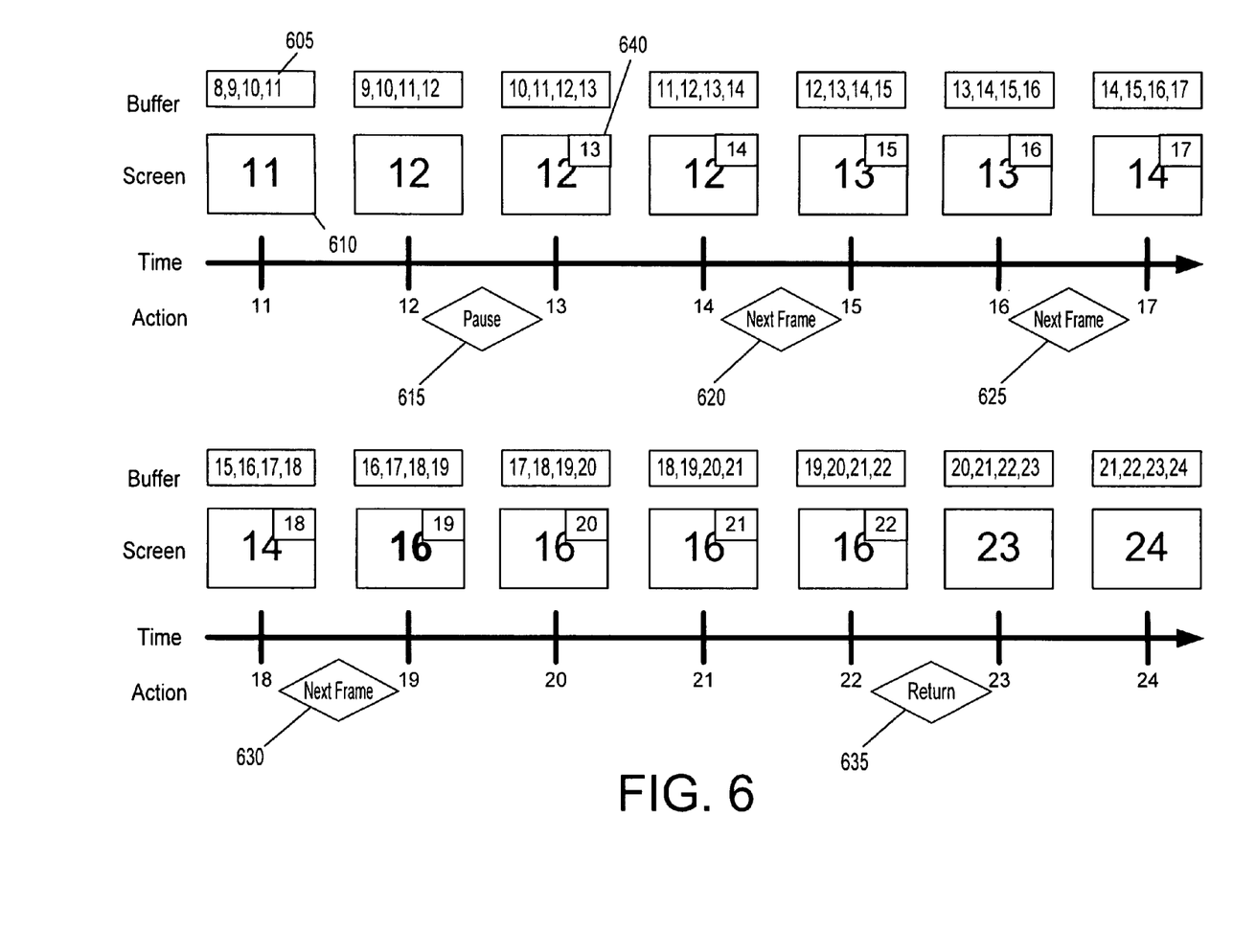
FIG. 6 illustrates a timing diagram of the buffering process performed by an example embodiment of the present invention.

FIG. 6 illustrates a buffer management process for the second embodiment of the present invention. In this example, the second embodiment only has 4 frames of storage in the buffer. FIG. 6 illustrates how buffer 605 (a type of video buffer 425) and screen 610 respond over a timeline to commands from remote control 105. For exemplary purposes, in the example embodiment in FIG. 6, the buffer 605 may only contain 4 video frames; however, in practice, the buffer may contain any practical amount of memory, limited primarily by cost and implementation.

The example buffer management process begins operation in playback mode, at this time the buffer 605 contains the last 4 frames decoded by decoder 415. During both playback and capture mode, the buffer 605 is updated to include first resolution video frames of the last 4 images decoded by decoder 415 from the input video stream.

At timeline step 11, the display device operates in playback mode; providing video playback of the input video stream at the first resolution, e.g., full-screen resolution, while buffering frame 11 into buffer 605.

At timeline step 12, playback continues at the first resolution. Since the buffer employs a FIFO management scheme for video frame storage, frame 8 is removed, and frame 12 is buffered into buffer 605.

Between timeline steps 12 and 13, the video display unit 135 receives a pause command 615, causing the system to switch from playback mode to capture mode.

Beginning at timeline step 13, the system operates in capture mode.

In capture mode, the buffer 605 continues to buffer images at the first resolution and playback continues using PiP 640 at the second resolution. The image displayed at the first resolution is the video frame that was displayed immediately prior to when capture mode was initiated.

Accordingly, at timeline step 13, video frame 12 is displayed at the first resolution and video playback of frame 13 continues in PiP 640.

At timeline step 14, video playback continues in PiP 640 and the buffer continues to cycle video frames.

Between timeline steps 14 and 15, the video display unit 135 receives a next command 620, causing the still video frame 12 to be replaced by the next corresponding video frames in the buffer, i.e., frame 13.

At timeline step 16, playback continues with video frame 16 in PiP 640.

Between timeline steps 16 and 17, the video display unit 135 receives a next command 625, causing the still video frame 13 to be replaced by the next corresponding video frame 14 from the buffer. Furthermore video playback continues showing video frame 17 in the PiP window 640.

At timeline step 18, playback continues with video frame 18 in PiP 640.

Between timeline steps 18 and 19, the video display unit 435 receives a next command 630, causing the video frame 14 to be replaced by the frame 16. The jump from frame 14 to 16 is due to the fact that frame 16 is the next corresponding frame available in the buffer 605.

From timeline step 19 to 22, video playback continues in PiP 640, showing video frames 19-22, and buffer 605 continuously updates by shifting out the oldest frame and adding in the newest frame.

Between timeline steps 22 and 23, the video display unit 135 receives a return signal 635 which switches the video display unit 135 back to playback mode, thereby returning video playback to the first resolution.

Figure 7:
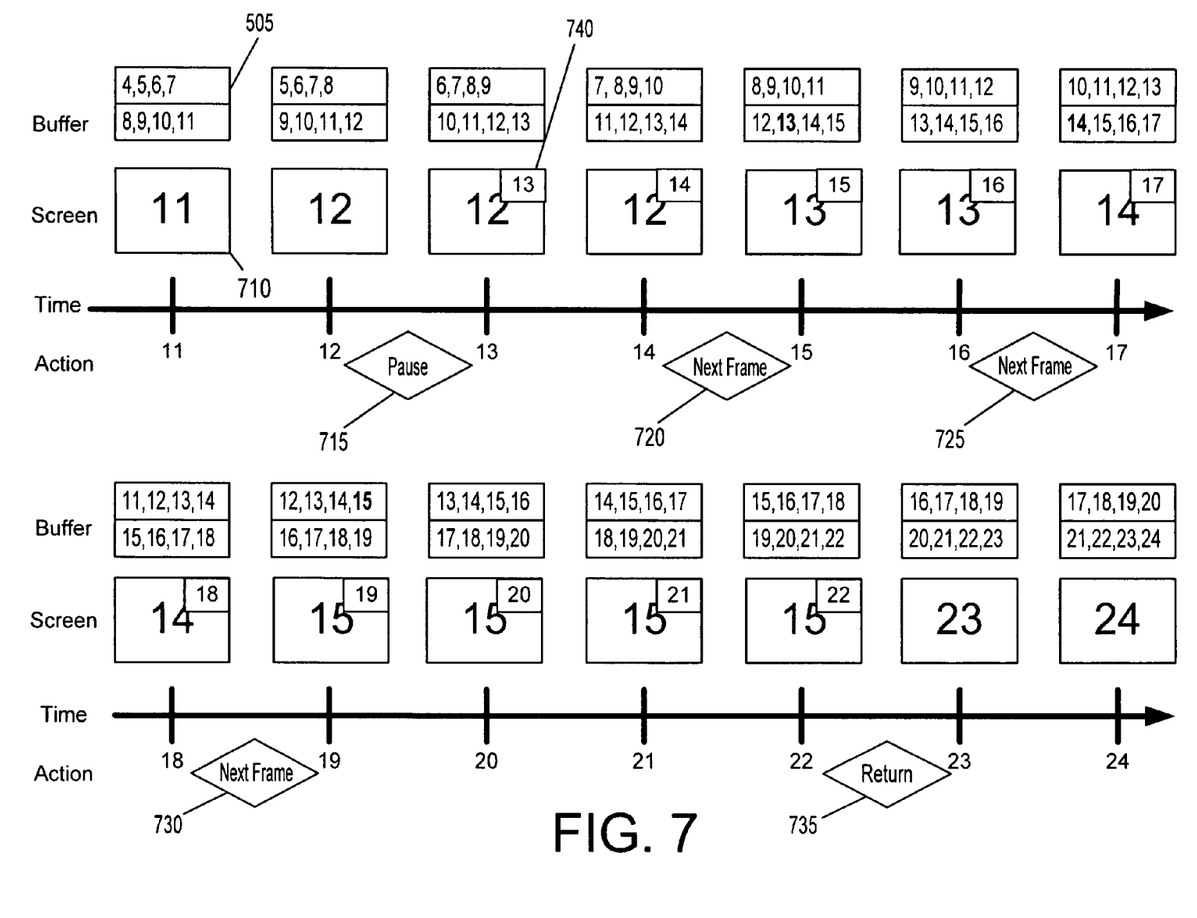
FIG. 7 illustrates a timing diagram of the buffering process performed by another example embodiment of the present invention.

FIG. 7 illustrates a second buffer management process for the second example embodiment of the present invention. In this embodiment, the buffer 125 includes an 8 video frame buffer 705. Buffer 705 provides additional image buffering and operates in similar fashion to buffer 605 (from FIG. 6).

At timeline step 11, the system begins operating in playback mode. During playback mode, buffer 705 contains 8 frames prior to the current frame at the first resolution.

At timeline step 12, playback continues at the first resolution. Since the buffer employs a FIFO management scheme for video frame storage, frame 4 is removed, and frame 12 is buffered into buffer 705.

Between timeline steps 12 and 13, the video display unit 435 receives a pause command 715, causing the system to switch from playback mode to capture mode.

In capture mode, playback of video continues using a PiP display 740.

Accordingly, at timeline step 13, buffer 705 is updated to include video frame 13, while video frame 12 is displayed at the first resolution and video playback of frame 13 continues in PiP 740.

Between timeline steps 14 and 15, the video display unit 435 receives a next command 720, causing the displayed video frame 12 to be replaced by video frame 13, the next corresponding image in buffer 705.

At timeline step 15, video playback continues in PiP 740 of video frame 15.

Between timeline steps 16 and 17, the video display unit 435 receives a next command 725, causing the displayed video frame to change to video frame 14.

At timeline step 17, video playback continues in Pip 740 of video frame 17.

Between steps 18 and 19, the video display unit 435 receives a next command 730, causing the displayed frame 14 be replaced by frame 15.

From timeline steps 19 to 22, playback continues on the PiP window at the second resolution. With each of the transitions, second buffer 705 is updated with successive copies of the video frames, and the oldest frames from the first buffer 705 are removed.

Between timeline steps 22 and 23, the video display unit 435 receives return command 735. The return command 735 causes the display unit 435 to return to playback mode.

Thereafter, at timeline step 24, video display unit 435 continues operating in playback mode.

While FIG. 6 and 7 provide similar buffer management processes for the second example embodiment of the present invention, they also illustrate that the use of a larger buffer may provide the benefit of greater video retention time. For example, the larger buffer of FIG. 7 avoids the jump from frame 14 to 16 that occurs at step 18. Similarly, the process of FIG. 7 may allow a user to switch to a previous still video frame later along the timeline than the process of FIG. 6.

While FIGS. 6 and 7 provide alternative example embodiments, the invention is not limited to the illustrated buffering management processes disclosed, and may be extended to alternative approaches depending on storage, processing, and interactive capabilities which may be incorporated into the display device.

Although embodiments of the invention are discussed primarily with respect to apparatuses and methods for buffering and capturing video frames, other uses and features are possible. Various embodiments discussed herein are merely illustrative, and not restrictive, of the invention. For example, the system may be configured to use either two decoders each capable of decoding at a single resolution, or a single decoder capable of decoding a video stream at a plurality of resolutions.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Thus embodiments of the present invention produce and provide a DISPLAY SYSTEM AND METHOD FOR A FREEZE FRAME FEATURE FOR STREAMING VIDEO. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A system for capturing a still images from a video stream capable of operating in a playback mode and a capture mode, comprising:
   a display;
   a control device that provides a first signal and a second signal;
   a video decoder that decodes the video stream at a first resolution and at a second resolution; and
   a signal receiver that signals the system to switch from operating in the playback mode to operating in the capture mode in response to the first signal, and from operating in the capture mode to operating in the playback mode in response to the second signal,
   wherein the video decoder simultaneously decodes the video stream at both the first resolution and the second resolution when operating in capture mode,
   wherein when operating in capture mode the display simultaneously displays the video stream at the second resolution over the still images including a current video frame at the first resolution, and
   wherein when operating in capture mode the control device provides a save command that initiates an interface on the display device displaying a set of options including a save option, an email option, and an archive option;
   initiates storing of the current video frame in a memory storage device by identifying the save option with a selection signal;
   initiates emailing of the current video frame to a remote location by identifying the email option with the selection signal; and
   initiates archiving of the current video frame by identifying the archive option with the selection signal.

2. The system of claim 1, further comprising:
   a buffer coupled to the video decoder that stores a preset number of consecutive video frames from the video stream preceding the current video frame at the first resolution;
   wherein the current video frame is the last frame of the video stream that is displayed at the first resolution during playback mode, and at the second resolution in capture mode.

3. The system of claim 2, further comprising a video processor for combining video frames from the video decoder and buffer based on whether the system is operating in the playback mode or the capture mode.

4. The system of claim 1, wherein the video decoder comprises a first video decoder that decodes the video stream at the first resolution and a second video decoder that decodes the video stream at the second resolution.

5. The system of claim 4, further comprising a video processor for combining video frames from the video decoder and the second video decoder based on whether the system is operating in the playback mode or the capture mode.

6. The system of claim 5, wherein the video processor receives a signal indicating the operating mode of the system.

7. A method for capturing a still image from an input video stream, the method comprising:
 receiving the input video stream;
 operating in a playback mode, including decoding and playing the input video stream at a first resolution;
 receiving a first command from a control device;
 switching from operating in the playback mode to a capture mode in response to the first command from the control device; and
 operating in capture mode, including showing a still video frame from the input video stream while decoding and playing the input video stream at a second resolution,
 wherein operating in the playback mode further includes decoding the input video stream at the first resolution by a first decoder, and
 wherein operating in the capture mode further comprises decoding the input video stream at the first resolution by a first decoder while decoding the input video stream at a second resolution by a second decoder;
 receiving an email command from the control device that initiates an interface displaying a set of options including an email option;
 emailing of the still video frame to a remote location when receiving a selection signal from the control device identifying the email option;
 receiving an archive command from the control device that initiates the interface displaying a set of options including an archive option; and
 archiving the still video frame when receiving a selection signal identifying the archive option.

8. The method of claim 7, further comprising:
 receiving a second command from the control device;
 switching from operating in the capture mode to operating in the playback mode in response to the second command from the control device and then performing playback of the input videos stream in the first resolution.

9. A method for capturing a still image from an input video stream, the method comprising:
 receiving the input video stream;
 operating in a playback mode, including decoding and playing the input video stream at a first resolution;
 receiving a first command from a control device;
 switching from operating in the playback mode to a capture mode in response to the first command from the control device;
 operating in capture mode, including decoding and showing a still video frame at a first resolution from the input video stream while decoding and playing the input video stream at a second resolution;
 buffering a preset number of consecutive video frames from the video stream preceding a current video frame at the first resolution, the current video frame being the last frame of the video stream that is displayed at the first resolution during playback mode and at a second resolution in capture mode;
 receiving a previous image command from the control device;
 verifying if the buffer contains a previous still video frame from the video stream that precedes the displayed still video frame when the previous image command is received and before displaying the previous still video frame;
 replacing the still video frame being shown with the previous still video frame;
 receiving an email command from the control device that initiates an interface displaying a set of options including an email option;
 emailing of the still video frame to a remote location when receiving a selection signal identifying the email option;
 receiving an archive command from the control device that initiates the interface displaying a set of options including an archive option; and
 archiving the still video frame when receiving a selection signal identifying the archive option.

10. The method of claim 9, wherein the buffering step includes removing frames from the buffer in a predetermined order when the buffer is full.

11. The method of claim 9, further comprising:
 receiving a next image command from the control device;
 identifying the next video frame in the buffer that follows the displayed still video frame;
 replacing the still video frame with the identified next video frame.

12. The method of claim 9, further comprising:
 receiving a save command from the control device that initiates the interface displaying a set of options including a save option; and
 storing the still video frame being shown in a memory storage device when receiving a selection signal identifying the save option.

\* \* \* \* \*